(12) United States Patent
Jeon (10) Patent No.: US 7,031,387 B2
(45) Date of Patent: Apr. 18, 2006

(54) B PICTURE MODE DETERMINING METHOD AND APPARATUS IN VIDEO CODING SYSTEM

(75) Inventor: Byeong Moon Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 380 days.

(21) Appl. No.: 10/101,130

(22) Filed: Mar. 19, 2002

(65) Prior Publication Data

US 2003/0179826 A1  Sep. 25, 2003

(51) Int. Cl.
H04B 1/66  (2006.01)
(52) U.S. Cl. ............... 375/240.15; 375/240.16; 375/240.03; 375/240.13; 375/240.14; 382/238; 382/236; 382/251; 348/699
(58) Field of Classification Search .......... 375/240.15, 375/240.12, 240.16, 240.03, 240.11, 240.13, 375/240.14; 709/247; 348/699; 382/236, 382/238, 251

See application file for complete search history.

(56) References Cited

U.S. PATENT DOCUMENTS

| 5,832,234 | A | * | 11/1998 | Iverson et al. | 709/247 |
| 5,991,447 | A | * | 11/1999 | Eifrig et al. | 382/236 |
| 6,418,166 | B1 | * | 7/2002 | Wu et al. | 375/240.12 |
| 6,442,204 | B1 | * | 8/2002 | Snook et al. | 375/240.16 |

FOREIGN PATENT DOCUMENTS

WO   WO 00/45602   8/2000

OTHER PUBLICATIONS

Kok, C.W., et al., "Video Coding With Adaptive Block Update," 1997 IEEE International Symposium on Circuits and Systems, Jun. 9-12, 1997, Hong Kong, pp. 1113-1116.
Joint Video Team (JVT) of ISO/IEC MPEG and ITU-T VCEG, "Joint Model No. 1 (JM-1)," Pattaya, Thailand, Dec. 3-7, 2001.

* cited by examiner

*Primary Examiner*—Shawn S. An
(74) *Attorney, Agent, or Firm*—Lee, Hong, Degerman, Kang & Schmadeka

(57) ABSTRACT

A B picture mode determining method and apparatus in a video coding system includes the steps of: setting sum of absolute difference (SAD) initial values of a 4×4 and 16×16 intra prediction mode, a forward prediction mode, a backward prediction mode, a bi-directional prediction mode and a direct prediction mode; calculating the SAD values of each mode; and selecting a mode having the smallest SAD value from the SAD values of the modes as a prediction mode for a B picture coding. A penalty value in consideration of the overhead bit of each mode is set as an SAD initial value, and especially, in order for the direct mode to be selected for the flat regions having the zero motions, the SAD initial value of the direct mode is set as $-16 \times QP_0(QP)$, so that the bit rate is considerably reduced and the coding performance of image information can be improved.

16 Claims, 6 Drawing Sheets

FIG. 1
CONVENTIONAL ART

QCIF IMAGE

B PICTURE MODE DETERMINING METHOD AND APPARATUS IN VIDEO CODING SYSTEM

BACKGROUND OF THE INVENTION

1. Field of the Invention

The present invention relates to a B picture mode determining method and apparatus in a video coding system, and more particularly, to a B picture mode determining method and apparatus in a video coding system in which direct prediction modes are selected as many as possible in a coding system using a B picture mode to thereby reduce a bit rate of the coding system.

2. Description of the Background Art

A 'B' picture in a video coding system such as an H.26L can be predicted from either or both of a previous and subsequent decoded 'P'

Thus, a coding system using the 'B' picture can obtain an improved coding efficiency compared to a coding system that uses only the 'P' picture, and especially, it can obtain a considerable gain for low motion image sequences.

The B pictures in the video coding system are coded in five modes such as an intra prediction mode having 4×4 and 16×16 block size, a forward prediction mode, a backward prediction mode, a bi-directional prediction mode and a direct prediction mode.

Figure 1:
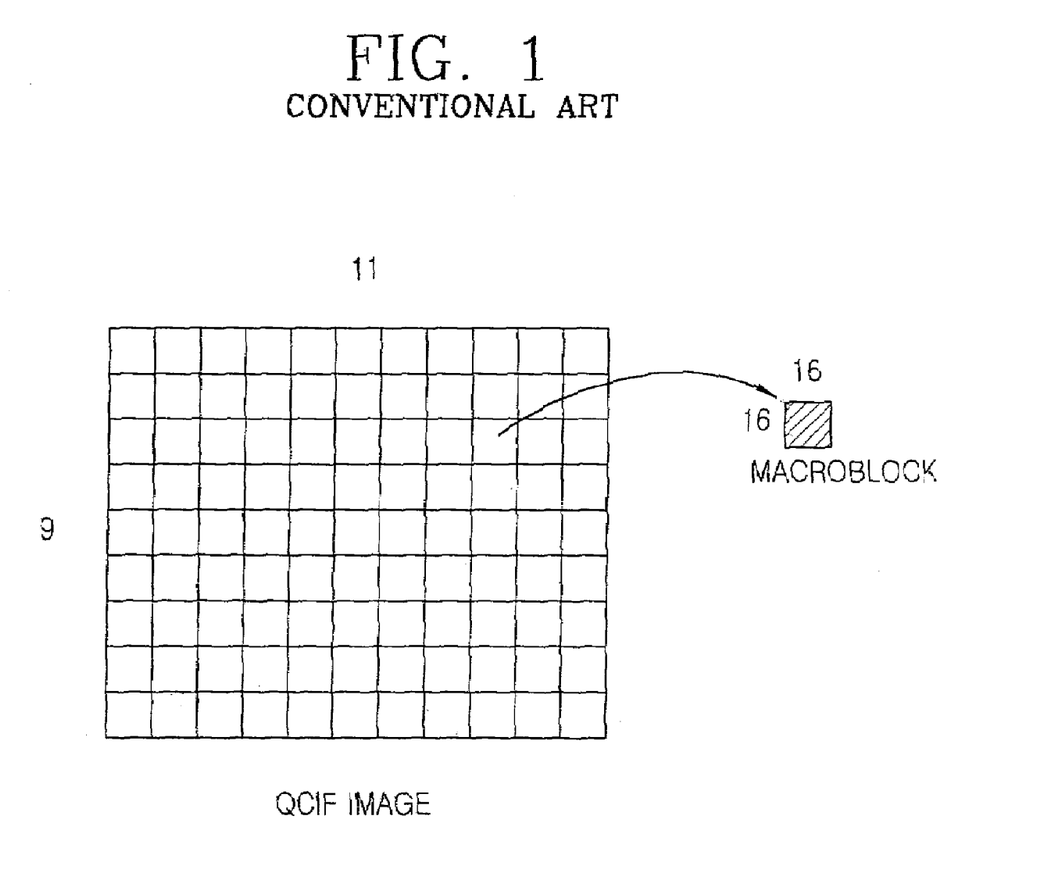
FIG. 1 is an explanatory view of a macro block in a quarter common intermediate format (QCIF) image.

Among the modes, the optimum mode determining method of a macro block (a basic unit of an image to be coded) as shown in FIG. 1 is that a sum of absolute difference (SAD) value, a prediction error measuring method between an original image and a predicted image, is calculated for the prediction modes, and one of them, which has the minimum SAD value, is selected as a prediction mode for the macro block.

In such a mode determining method, even though the optimum mode is determined on the basis of the SAD value according to the prediction error, there is always an overhead bit that is to be necessarily added according to a syntax of the mode.

The overhead bit affects the length of the overall bit stream, and accordingly, as bit rate is increased, degradation of coding performance of the video coding system may occur.

For example, if the bi-directional prediction mode is determined to be an optimum mode having the least SAD value, an overhead bit of four components such as reference frame information, forward and backward block size information, forward motion vector information and a backward motion vector information should be added to the bit stream to be coded, so that as the bit rate is increased, the coding performance of the video coding system is degraded.

SUMMARY OF THE INVENTION

Therefore, an object of the present invention is to provide an apparatus and method that renders a direct mode to which no overhead bit is added. The method subtracts 16×QP0(QP) from a computed SAD value, thereby considerably reducing bit rate and improving a coding performance of image information.

To achieve these and other advantages and in accordance with the purpose of the present invention, as embodied and broadly described herein, there is provided a B picture mode determining method and apparatus in a video coding system including the steps of: setting sum of absolute difference (SAD) initial values of a 4×4 and 16×16 intra prediction mode, a forward prediction mode, a backward prediction mode, a bi-directional prediction mode and a direct prediction mode; calculating the SAD values of each mode; and selecting a mode having the smallest SAD value from the SAD values of the modes as a mode for a macro block coding.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 2:
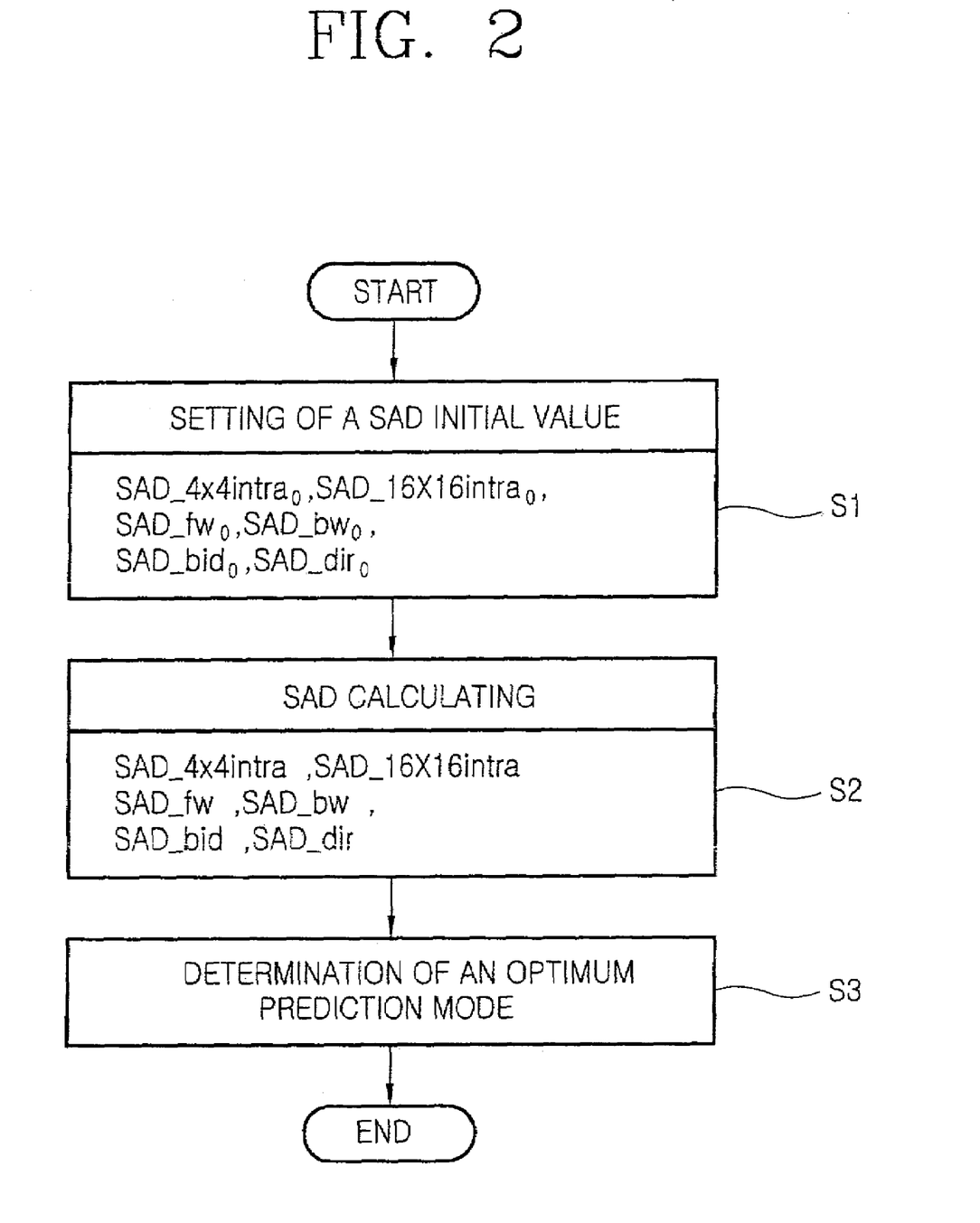
FIG. 2 is a flow chart of a method for determining a B picture mode in a video coding system in accordance with a preferred embodiment of the present invention.

FIG. 2 is a flow chart of a method for determining a B picture mode in a video coding system in accordance with a preferred embodiment of the present invention.

As shown in FIG. 2, a method for determining a B picture mode in a video coding system includes the steps of: setting SAD initial values of each mode including subtracting 16×QP0(QP) from an SAD initial set value, specifically an SAD initial set value of a direct mode, in order to increase the feasibility of selecting the direct mode as well as considering an overhead bit of each mode for such modes as 4×4 and 16×16 intra prediction mode, a forward prediction mode, a backward prediction mode, a bi-directional prediction mode, a direct prediction mode (S1); calculating the SAD value for each mode (S2); and selecting a mode having the smallest SAD value according to the calculation result as a mode for a B picture coding(S3).

The method for determining a B picture mode in a video coding system in accordance with the present invention will now be described with reference to FIGS. 3 and 4.

Figure 3:
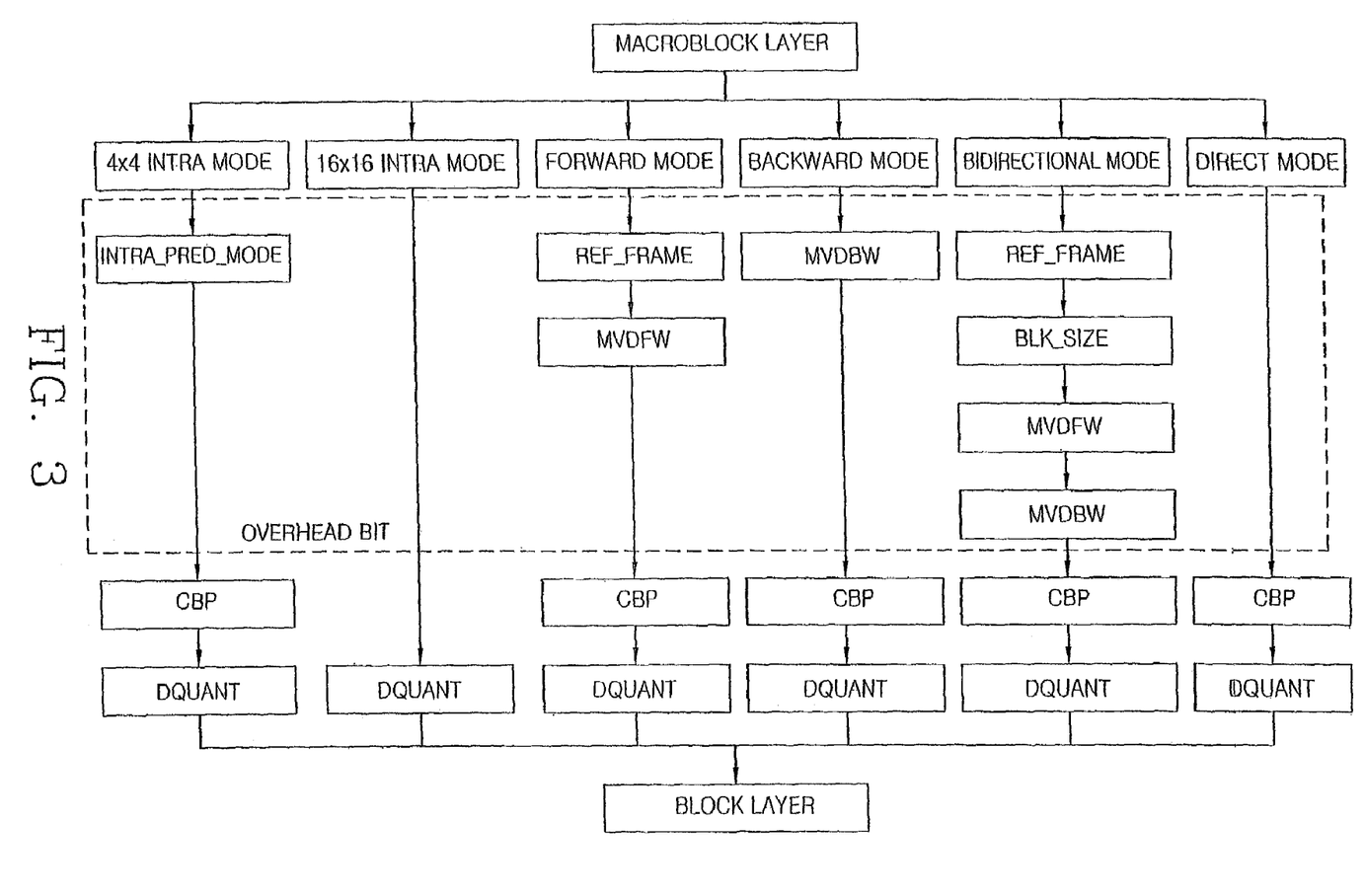
FIG. 3 is a diagram showing a macro block syntax of a B picture.

FIG. 3 is a diagram showing a macro block syntax of a B picture.

As shown in FIG. 3, the forward prediction mode requires two types of information, such as a reference frame (only if multiple reference frames are used) and a forward motion vector as an overhead bit. The backward prediction mode requires one type of information, such as a backward motion vector as an overhead bit. The bi-directional prediction mode requires four types of information, such as a reference frame, a forward and a backward block size, a forward motion vector and a backward motion vector.

A coded block pattern (CBP) indicates which 8×8 block of 16×16 macro blocks contains nonzero transform coefficients, and Dquant is a value set for a bit rate control of the video coding system.

Accordingly, in the B picture mode determining method in a video coding system, in order to calculate a prediction error calculation value, that is, an SAD value, a penalty value in consideration of the overhead bit of each mode is set as an initial value, and then, a prediction error calculation is performed.

Such calculation affects which mode is determined as an optimum prediction mode of the macro block.

Since the SAD value takes into account the influence of the overhead bit as well as the prediction error, the problems of the conventional mode determining method are overcome.

For the 16×16 intra and direct prediction mode, which do not require supplementary information to the syntax of the video coding system, no overhead bits exist. However, for the 16×16 intra mode, when expressing a mode type, at least 5 bits are required while the direct mode requires only 1 bit since a code_number of the direct mode is 0.

Accordingly, although the two modes do not require any overhead bit, an SAD initial value must be calculated by different methods.

For example, the low motion sequences are featured as flat regions with a zero motion.

When the number of modes assigned in the low motion sequences is compared through a simulation, it is noted that the 16×16 intra modes has a high probability to be selected in the flat regions.

However, for the 16×16 intra mode, multiple bits are required to express the mode type and bit loss results due to the increase in the number of bits.

Accordingly, in order to prevent 16×16 intra mode from being assigned to the flat regions having the zero motion, the B picture mode determining method in the video coding system in accordance with the present invention employs a method that effectively utilizes the zero motion characteristics.

That is, in order for the direct mode to be selected instead of 16×16 intra mode in a rode selection, $16 \times QP_0(QP)$ is subtracted from an SAD value of the direct prediction mode.

In this respect, QP0(QP) is a pointer to a quantization code 'QUANT' used for scaling a prediction mode selection.

For reference, a relation between 'QUANT' of H.263 and 'QP' of H.26L is $QUANT(QP)=QP_0(QP)=2^{QP/6}$.

Of course, there is a trade-off between a visual quality and a bit rate reduction. However, acceptable visual quality may be achieved and maintained since the number of bits saved is so large as to make the reduction in quality worthwhile.

Figure 4A:
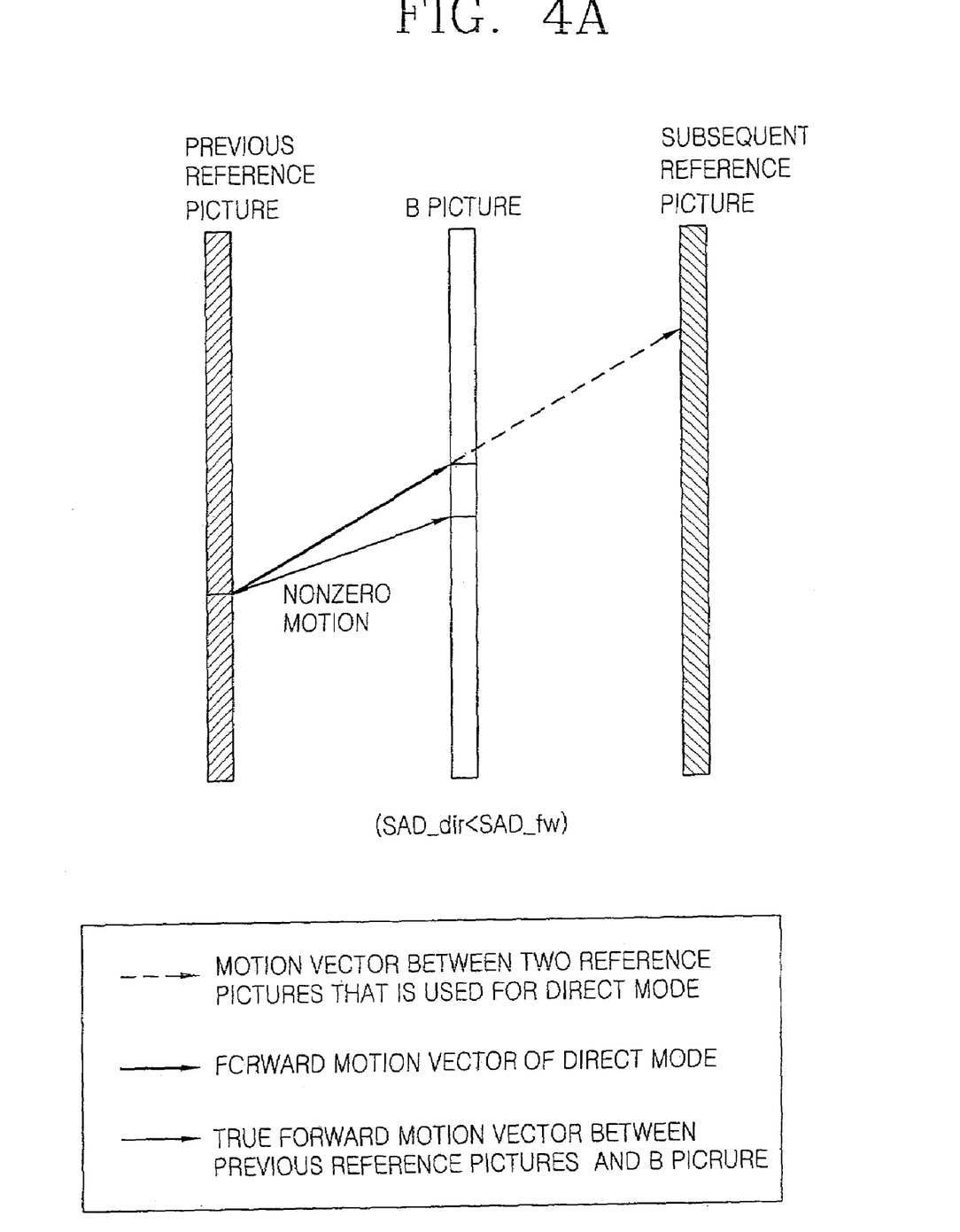
FIG. 4A is a graph showing a relation between a direct mode and a true forward motion in case that there is a little difference between a prediction mode and a true motion in an image with a high motion.
Figure 4B:
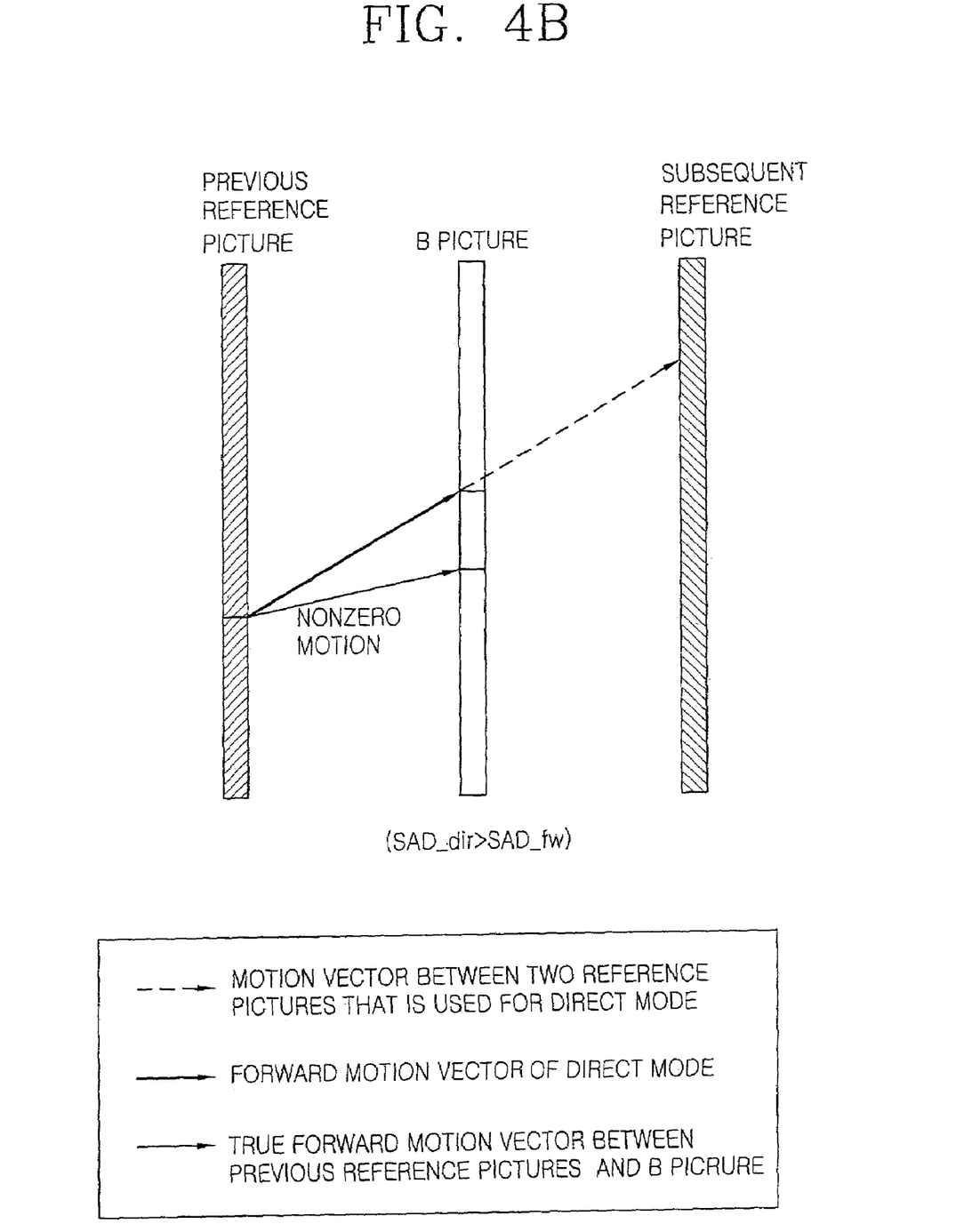
FIG. 4B is a graph showing a relation between a direct mode and a true forward motion in case that there is much difference between a prediction mode and a true motion in an image with a high motion.
Figure 4C:
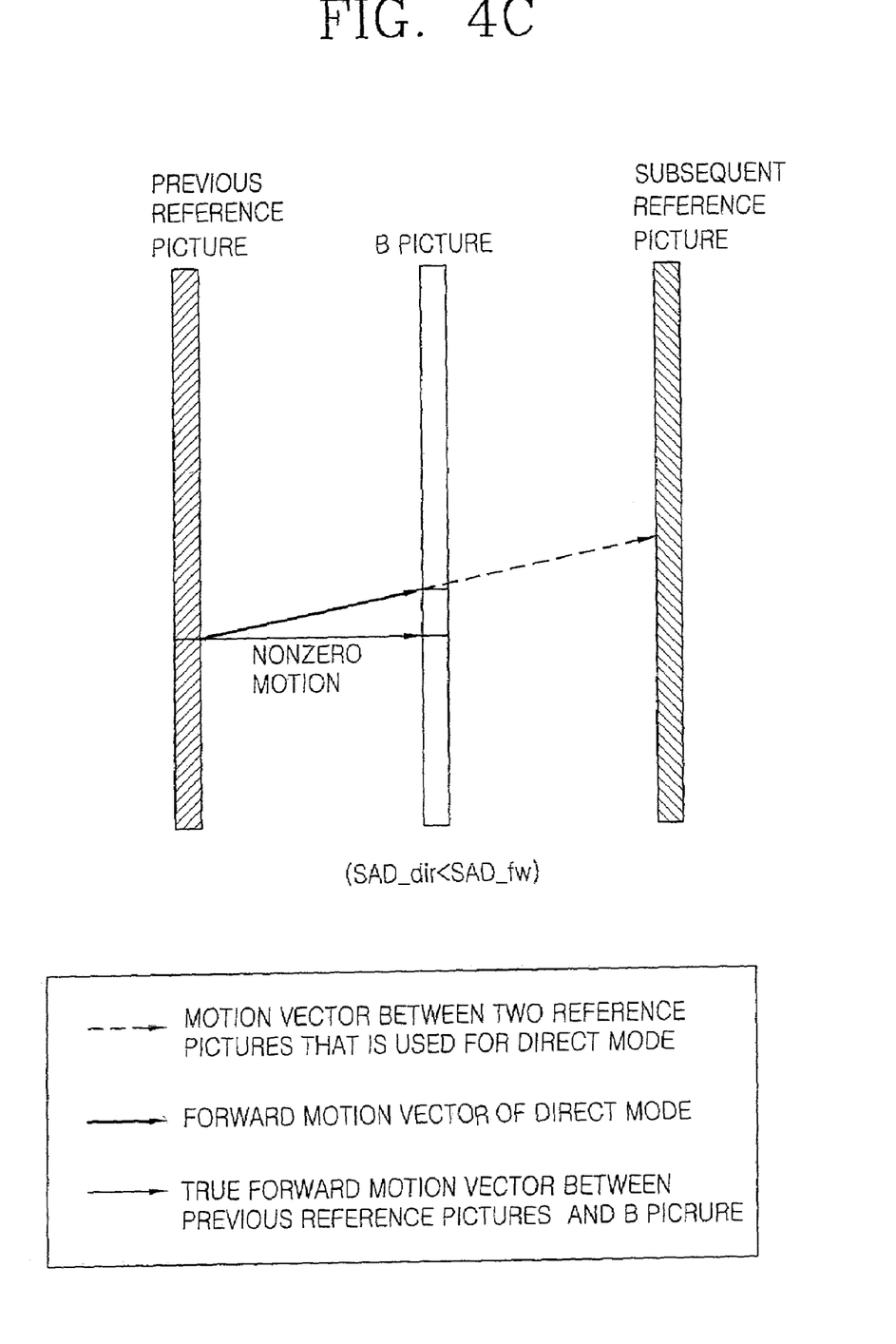
FIG. 4C is a graph showing a relation between a direct mode and a true forward motion in an image with a low motion.

FIGS. 4A through 4C shows relation between a direct mode and a true forward motion between a previous reference picture and a B picture in accordance with the present invention.

As shown in FIGS. 4A through 4C, the B picture prediction mode is selected as a direct mode due to the SAD value reduction of the direct mode, and the true motions are approximated to a forward motion of the direction.

However, if a difference between the direct prediction and the prediction according to the true motion is large, the B picture prediction mode is determined as a forward prediction mode as shown in FIG. 4B.

Such relation can be adopted to the backward and bi-directional mode in the same manner.

Namely, as shown in FIG. 4A, if an SAD value of the direct prediction mode is smaller than an SAD value of the forward prediction mode in spite of a comparatively high motion, the direct mode is selected against the forward, the backward and bi-directional modes, so that overhead bit amount added to information data does not exist.

Moreover, as shown in FIG. 4C, if the motion is low, the direct mode is also selected against the forward, the backward and the bi-directional modes, especially if there is no motion, since the 16×16 intra mode is changed into a direct mode and more effective bit rate reduction is possible.

Consequently, an improved performance can be provided for the B pictures by adopting the above-described mode selecting method.

At this time, the SAD initial value of each mode in consideration of the coding syntax for the B picture can be obtained as follows:

4×4 Intra Mode:

$$SAD\_4 \times 4\_intra_0 = QP_0(QP) \times Order\_of\_prediction\_mode + 24 \times QP_0(QP) \quad (1)$$

16×16 Intra Mode:

$$SAD\_16 \times 16\_intra_0 = 0 \quad (2)$$

Forward Prediction Mode:

$$SAD\_fw_0 = QP_0(QP) \times (2 \times code\_number\_of\_ref\_frame + Bits\_to\_code\_MVDFW) \quad (3)$$

Backward Prediction Mode:

$$SAD\_bw_0 = QP_0(QP) \times Bits\_to\_code\_MVDBW \quad (4)$$

Bi-Directional Prediction Mode:

$$SAD\_bid_0 = QP_0(QP) \times (2 \times code\_number\_of\_ref\_frame + Bits\_to\_code\_forward\_blk\_size + Bits\_to\_code\_backward\_blk\_size + Bits\_to\_code\_MVDFW + Bits\_to\_code\_MVDBW) \quad (5)$$

Direct Prediction Mode:

$$SAD\_dir_0 = -16 \times QP_0(QP) \quad (6)$$

wherein $SAD\_4 \times 4\_intra_0$, $SAD\_16 \times 16\_intra_0$, $SAD\_fw_0$, $SAD\_bw_0$, $SAD\_bid_0$, $SAD\_dir_0$, signifies initial values in each mode.

The above equations will now be described with reference to FIG. 3.

The code_number_of_ref_frame indicates a code number of a reference frame. For example, when the immediately previous frame is referenced, a code number is '0', while when a frame two frames removed from the current frame is referenced, a code number is '1'. The order_of_prediction_mode indicates a probability order that determines the 4×4 intra prediction mode according to a mode of the neighboring block. The bits_to_code_MVDFW indicates the number of bits for expressing a forward motion vector difference. The bits_to_code_MVDBW indicates the number of bits for expressing the backward motion vector difference. The bits_to_code_forward_blk_size indicates the number of bits for expressing the block size used for the forward motion prediction. The bits_to_code_backward- _blk_size indicates the number of bits for expressing the block size used for backward motion prediction.

A B picture mode determining method in a video coding system in accordance with a different embodiment of the present invention is as follows.

SAD initial values of each mode are set in consideration of overhead bit of the 4×4 and 16×16 intra prediction mode, the forward prediction mode, the backward prediction mode, the bi-directional prediction mode and the direct prediction mode. The SAD values of each mode are respectively calculated on the basis of the set SAD initial values. A certain value is subtracted from or added to each of the calculated SAD values (For example, in case of the direct prediction mode, $16 \times QP_0(QP)$ is subtracted from the SAD value of the direct prediction mode, while in case of the 4×4 intra prediction mode, $24 \times QP_0(QP)$ is added to the SAD value of the 4×4 intra prediction mode) so as to heighten a feasibility that the direct mode can be selected in the mode selection. And then, a mode having the smallest SAD value among the SAD values of each mode is selected as a mode for a B picture coding.

In a still different embodiment of the present invention, the B picture mode determining methods in the video coding system are programmed in one process so as to be adopted to the video coding system.

At this time, obviously, a calculation unit (i.e., an SAD calculator, an arithmetic calculator, etc.) and a selecting unit should be included related to the B picture mode determining method in the video coding system.

As so far described, The B picture mode determining method in a video coding system in accordance with the present invention has the following advantage.

That is, a penalty value in consideration of the overhead bit of each mode is set as an SAD initial value. Specifically, in order that the direct mode instead of the 16×16 intra mode is selected for the flat regions having no motion, the SAD initial value of the direct mode is set as $-16 \times QP_0(QP)$, so that the bit rate is considerably reduced and the coding performance of image information may be improved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A B picture mode determining method of a video coding system comprising the steps of:
setting SAD initial values of each mode in consideration of an overhead bit of a 4×4 and 16×16 intra prediction mode, a forward prediction mode, a backward prediction mode, a bi-directional prediction mode and a direct prediction mode;
calculating SAD values of each mode on the basis of the set SAD initial values; and
selecting a mode having the smallest SAD value among the SAD values of each mode as a macro block prediction mode for a B picture coding,
wherein the SAD initial value of the 4×4 intra prediction mode is defined as QP0(QP)×Order_of_prediction_mode+24×QP0(QP) the Order_of_prediction_mode a probability order that determines the 4×4 intra prediction mode according to a mode of a neighboring block.

2. The method of claim 1, wherein, the SAD initial values are set by one of subtracting a certain value from and adding a certain value to the SAD initial set values of each mode in consideration of the overhead bit of each mode.

3. The method of claim 2, wherein the certain value is −16×QP0(QP) for the direct prediction mode and is 24×QP0 (QP) for the 4×4 intra prediction mode.

4. The method of claim 3, wherein, in case that a difference between a motion vector value calculated from the direct mode and a motion vector value calculated from a true motion is nonacceptable, the QP0(QP) is set so that B pictures are selected as a motion vector value predicted from a true motion, rather than from the direct mode.

5. The method of claim 1, wherein the SAD initial value of the 16×16 intra prediction mode is '0'.

6. The method of claim 1, wherein the SAD initial value of the forward prediction mode is defined as $QP_0(QP) \times (2 \times$ code_number_of_ref_frame+Bits_to_code_MVDFW), wherein code_number_of_ref_frame is a code number of a reference frame and Bits_to_code_MVDFW is the number of bits for expressing a forward motion vector difference.

7. The method of claim 1, wherein the SAD initial value of the backward prediction mode is defined as QP0(QP)× Bits_to_code_MVDBW, wherein the Bits_to_code_MVDBW is the number of bits for expressing the backward motion vector difference.

8. The method of claim 1, wherein the SAD initial value of the bi-directional prediction mode is defined as $QP_0(QP) \times$ (2×code_number_of_ref_frame+Bits_to_code_forward_blk_size+Bits_to_code_backward_blk_size+Bits_to_code_MDVFW+Bits_to_code_MDVBW), wherein the Bits_to_code_forward_blk_size the number of bits for expressing a block size used for the forward motion prediction, the Bits_to_code_backward_blk_size is the number of bits for expressing a block size used for the backward motion prediction, the Bits_to_code_MVDBW is the number of bits for expressing the backward motion vector difference, and the Bits_to_code_MVDFW is the number of bits for expressing the forward motion vector difference.

9. The method of claim 1, wherein the SAD initial value of the direct prediction mode is $-16 \times QP_0(QP)$.

10. The method of claim 1, wherein calculating the SAD comprises at least one of subtracting a certain value from and adding a certain value to the calculated SAD value to heighten a probability that the direct mode is selected as a macro block prediction mode.

11. The method of claim 10, wherein $16 \times QP_0(QP)$ is subtracted from the SAD value of the calculated direct prediction mode and $24 \times QP_0(QP)$ is added to the SAD value of the 4×4 intra prediction mode.

12. The method of claim 11, wherein, in case that a difference between a motion vector value calculated from the direct mode and a motion vector value calculated from a true motion is nonacceptable, the $QP_0(QP)$ is set so that B pictures are selected as a motion vector value predicted from a true motion, rather than from the direct mode.

13. A B picture mode determining apparatus of a video coding system comprising:
a processor performing a program for setting SAD initial values of each mode in consideration of an overhead bit of a 4×4 and 16×16 intra prediction mode, a forward prediction mode, a backward prediction mode, a bi-directional prediction mode and a direct prediction mode, calculating the SAD value of each mode on the basis of the set SAD initial value, and selecting a mode having the smallest SAD value of the calculated SAD values as a mode for a B picture coding, wherein the processor sets the SAD initial values of each mode by one of subtracting a certain value from and adding a certain value to the SAD initial set value of each mode in consideration of the overhead bit of each mode the certain value is $-16 \times QP_0(QP)$ for the direct prediction mode and is $24 \times QP_0(QP)$ for the 4×4 intra prediction mode and, if a difference between a motion vector value calculated from the direct mode and a motion vector value calculated from a true motion is nonacceptable, the $QP_0(QP)$ is set so that B pictures are selected as a motion vector value predicted from a true motion, rather than from the direct mode.

14. The apparatus of claim 13, wherein the processor one of subtracts a certain value from and adds a certain value to the calculated SAD value to heighten a probability that the direct mode is selected in a mode selection.

15. The apparatus of claim 14, wherein the certain value is $-16 \times QP_0(QP)$ for the direct prediction mode and is $24 \times QP_0(QP)$ for the 4×4 intra prediction mode.

16. The apparatus of claim 15, wherein, in case that a difference between a motion vector value calculated from the direct mode and a motion vector value calculated from a true motion is nonacceptable, the $QP_0(QP)$ is set so that B pictures are selected as a motion vector value predicted from a true motion, rather than from the direct mode.

* * * * *